United States Patent [19]

Mussemann et al.

[11] Patent Number: 5,471,625
[45] Date of Patent: Nov. 28, 1995

[54] METHOD AND APPARATUS FOR ENTERING A LOW-POWER MODE AND CONTROLLING AN EXTERNAL BUS OF A DATA PROCESSING SYSTEM DURING LOW-POWER MODE

[75] Inventors: Gary A. Mussemann, Austin, Tex.; Joseph C. Circello, Phoenix, Ariz.; James G. Gay, Pflugerville, Tex.

[73] Assignee: Motorola, Inc., Schaumburg, Ill.

[21] Appl. No.: 125,851

[22] Filed: Sep. 27, 1993

[51] Int. Cl.⁶ .............................. G06F 1/32; G06F 13/00
[52] U.S. Cl. .......................... 395/750; 395/550; 395/280
[58] Field of Search .................................. 364/492, 200; 295/750, 425, 200, 800, 325

[56] References Cited

U.S. PATENT DOCUMENTS

| | | | |
|---|---|---|---|
| 3,838,357 | 10/1973 | Billeg, Jr. ................................. | 331/74 |
| 4,137,563 | 6/1977 | Tsunoda .................................. | 364/217 |
| 4,203,153 | 4/1978 | Boyd ...................................... | 364/200 |
| 4,228,496 | 10/1980 | Katzman et al. ....................... | 395/200 |
| 4,267,577 | 5/1981 | Hashimoto et al. .................... | 364/707 |
| 4,316,247 | 2/1982 | Iwamoto ................................. | 364/200 |
| 4,365,290 | 12/1982 | Nelms et al. ........................... | 364/200 |
| 4,627,022 | 12/1986 | Mensink et al. ........................ | 395/475 |
| 4,748,560 | 5/1988 | Kataoka ................................... | 364/200 |
| 4,794,525 | 12/1988 | Pickert et al. .......................... | 395/750 |
| 5,151,855 | 9/1992 | Gray et al. .............................. | 395/750 |
| 5,175,845 | 12/1992 | Little ....................................... | 395/750 |
| 5,230,074 | 7/1993 | Canova, Jr. et al. ................... | 364/492 |
| 5,300,874 | 4/1994 | Shimamoto et al. .................... | 364/492 |
| 5,339,446 | 8/1994 | Yamasaki et al. ....................... | 395/750 |
| 5,361,392 | 11/1994 | Fourcroy et al. ....................... | 395/800 |

*Primary Examiner*—Jack B. Harvey
*Assistant Examiner*—David A. Wiley
*Attorney, Agent, or Firm*—Keith E. Witek

[57] ABSTRACT

A method and apparatus for placing a data processor (12) into a low-power mode of operation using a system (10). The system (10) has a processor (12). The processor (12) has access to a bus (18). The bus (18) is coupled to a bus controller (14). The processor (12) sends a broadcast cycle out through the bus (18) when the processor (12) desires to enter a low-power mode of operation. The bus controller (14) determines that the broadcast cycle has been sent on the bus (18). The bus controller (14) waits a predetermined amount of time to process the low-power request and grants permission to the processor (12) to enter the low-power mode via the communication of a transmission termination signal. The processor (12) conditionally drives either logic ones or a tri-state value onto the bus (18) depending upon whether or not the processor (12) has been granted ownership of the bus (18).

24 Claims, 5 Drawing Sheets

METHOD AND APPARATUS FOR ENTERING A LOW-POWER MODE AND CONTROLLING AN EXTERNAL BUS OF A DATA PROCESSING SYSTEM DURING LOW-POWER MODE

FIELD OF THE INVENTION

The present invention relates generally to data processors, and more particularly, to a low-power mode and corresponding low-power bus protocol for a data processor.

BACKGROUND OF THE INVENTION

In the integrated circuit industry, communication among multiple microprocessors or multiple integrated circuits is crucial. A bus protocol is usually used to efficiently interface one integrated circuit to other integrated circuits in an electrical system.

In some cases, a first integrated circuit within an electrical system may request or be required to enter and operate in a low-power mode of operation. In many cases, systems are designed so that once the first integrated circuit, usually by software command enters low-power mode, it does so automatically, ignoring its external electrical interfaces within a synchronized or protocol-based system environment. The problem with this type of system interfacing is that the entrance into the low-power mode of operation by the first integrated circuit may require special preprocessing, may require peripherals to be informed of the low-power mode or synchronized with the low-power mode, may not be timely and may need to be delayed by the system until a more appropriate time, etc. Due to the fact that the processor automatically entered the low-power mode, the system was not able to delay or better prepare for the low-power mode and system complications can occur. Other integrated circuits have an external integrated circuit pin specifically designed for informing an integrated circuit if a low-power mode can or cannot be entered when requested. Due to the fact that small integrated circuits are desired, the number of external pins on an integrated circuit should be kept at a minimum. Therefore, the adding of the extra external pin to control low-power mode entrance is not completely advantageous.

SUMMARY OF THE INVENTION

The previously mentioned disadvantages are overcome and other advantages achieved with the present invention. In one form, the present invention comprises a method for controlling a bus within a data processing system. The data processing system has a data processor coupled by at least one control bit line to circuitry for providing bus management. The method involves determining that the data processor is to be placed into a low-power mode. A low-power mode broadcast cycle is performed wherein the data processor communicates to the circuitry for providing bus management that the data processor is to be placed into a low-power mode of operation. The data processor is placed into a state wherein the data processor waits for the circuitry for providing bus management to communicate permission to the data processor to enter low-power mode. The permission is sent within a variable amount of time determined by the circuitry for providing bus management. The circuitry for providing bus management determines whether the data processor is to drive the bus to a predetermined plurality of voltage values or electrically tri-state the bus when the low-power mode of operation is entered.

In another form, the invention is a system used for controlling a bus. The system has circuitry for executing computer instructions. The circuitry for executing computer instructions has a normal mode of operation and a low-power mode of operation. The low-power mode of operation is entered by broadcasting a low-power request external to the circuitry for executing computer instructions and waiting for the circuitry for executing computer instructions to receive permission to enter the low-power mode of operation. The permission is received from external to the circuitry for executing computer instructions. A bus is coupled to the circuitry for executing computer instructions. The bus has at least one conductor for communicating information within the system. The at least one conductor is used to transmit the low-power request. A bus controller is coupled to the circuitry for executing computer instructions through the bus. The bus controller grants the circuitry for executing computer instructions selective access to the bus. The bus controller receives the low-power request from the bus and sends the permission to enter the low-power mode of operation to the circuitry for executing computer instructions. A time between the receipt of the low-power request and the sending of the permission is variable depending upon an amount of preparation that is performed by the bus controller. The preparation is used to prepare the system so that the circuitry for executing can enter the low-power mode of operation.

The present invention will be more clearly understood from the detailed description below in conjunction with the accompanying drawings.

DESCRIPTION OF A PREFERRED EMBODIMENT

Figure 1:
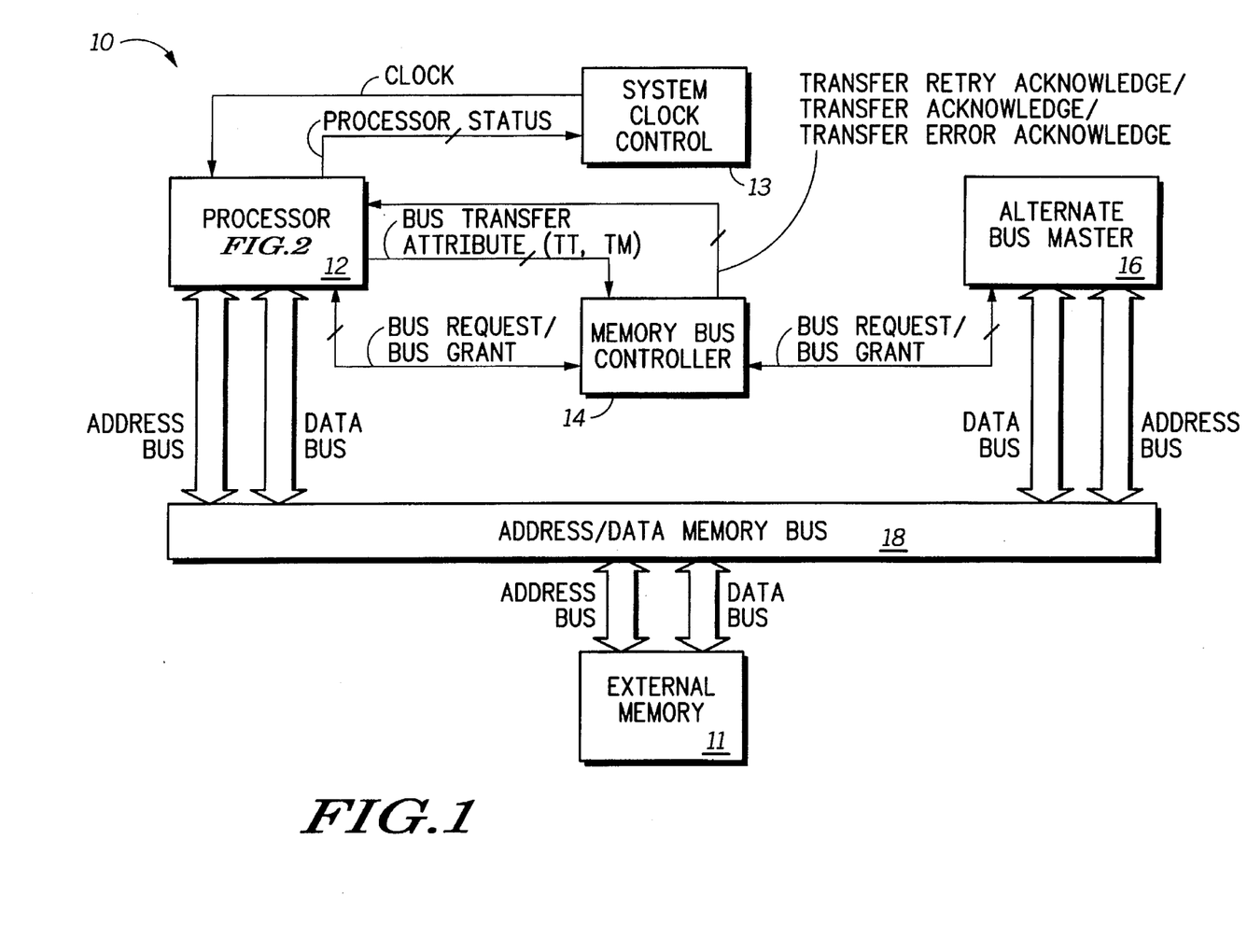
FIG. 1 illustrates, in a block diagram form, a data processing system in accordance with the present invention.

Illustrated in FIG. 1 is a data processing system 10. The data processing system has a processor 12. Processor 12 may be a microprocessor, a pipelined execution device, an application specific integrated circuit (ASIC) device, a programmable logic array (PLA), hard-wired logic, an execution unit at least partially software driven by microcode and/or nanocode, a plurality of execution devices, a digital signal processor (DSP), a computer, or the like. Processor 12 is connected to an address/data memory bus 18 via a data bus and address bus interconnections. Memory bus 18 is a plurality of conductors which allows processor 12 to communicate with external peripheral devices (e.g., memory, timers, etc.). In general, the address and data buses may be referred to as separate buses, a time multiplexed bus, or a single large bus (i.e., 64 or more bits).

Processor 12 is connected to a memory bus controller 14 via a bus request/bus grant line, a plurality of transfer termination lines (a transfer acknowledge (TA) line, a transfer error acknowledge (TEA) line, a transfer retry acknowledge (TRA) line), and one or more transfer attribute conductors. An alternate bus master 16 is another device which is similar to the processor 12. Alternate bus master 16, like processor 12, requests and acquires the use of the memory bus 18 via a bus request/bus grant control bus. The memory bus controller 14 arbitrates the access to the memory bus 18 and, in some respects, controls the operational modes (i.e., low-power mode) of the processor 12 and alternate bus master 16. In some cases, access to the memory bus 18 may be granted to the alternate bus master 16 to the exclusion of processor 12. In other situations, processor 12 may be granted exclusive access to the memory bus 18 while the alternate bus master 16 is denied access to the memory bus 18. It should be apparent that N bus requesters, where N is an integer greater than zero, may be connected to controller 14 wherein each of the N bus requesters may request access to memory bus 18.

During any bus transfer operation, the processor 12 sends one or more bits, referred to as bus transfer attribute bit(s), to the memory bus controller 14 to inform the memory bus controller 14 of the nature of the bus transfer. The memory bus controller 14 informs the processor 12 that the transfer was properly executed, failed, must be performed again, etc., via assertion of one or more transfer termination bits. Transfer termination bit(s) may, for example, be a transfer acknowledge (TA) signal or a bus transfer error acknowledge (TEA) signal which indicates to processor 12 that the transmission of the bus cycle was successful or unsuccessful, respectively.

The memory bus controller 14 decodes the bus transfer attribute signals transferred across memory bus 18 in order to detect a particular processor 12 is requesting entry into a low-power mode of operation. Any full or otherwise adequate partial decoding of bit transfers across memory bus 18 may be used to detect that the processor 12 has requested, via a broadcast cycle, to enter a low-power mode of operation. The low-power mode may be entered after reception of the proper transfer termination bits.

In general, for the purpose of giving permission to enter low-power mode, the TA and TEA signals function in the same manner. If the controller 14 decides to delay entrance into the low-power mode, or wants the processor 12 to re-broadcast the low-power mode broadcast cycle, the TRA signal is asserted. Withholding the assertion of the TEA or TA signals will also prevent/delay the entrance of processor 12 into the low-power mode of operation. In general, any transfer termination signal may be used as illustrated in FIG. 1 to perform an operation similar to the TA, TRA, and TEA signals, thereby replacing TA, TRA, and TEA.

By using the system illustrated in FIG. 1, the control of low-power operation within a system is improved, and the flexibility of low-power mode control on a system level becomes enhanced. In the examples below, the processor determines that a low-power mode needs to be entered by the execution of a program instruction referred to as low-power stop (LPSTOP) or an equivalent low-power stop mode instruction. Other methods may be used to determine when a low-power mode should be entered, such as the assertion of an external pin or the satisfying of certain low-power conditions within the processor 12.

For example, assume a system wherein the alternate bus master 16 is not connected to the system of FIG. 1. With only one data processor 12 and a less complex design of the bus controller 14, the processor 12 can independently and freely control the bus 18. The processor determines that the low-power mode is to be entered. A broadcast cycle is issued from processor 12 along the memory bus 18. The processor 12 then enters a state wherein the processor 12 waits for permission to enter low-power mode via a Transfer Acknowledge (TA) signal or a Transfer Error Acknowledge (TEA) signal. In general, if the processor 12 receives no response to the low-power broadcast cycle within the watchdog time frame, the controller 14 asserts the TEA signal as the controller 14 would do with any other unacknowledged bus cycle. The processor 12 assumes that low-power mode may be entered when the TEA signal is received. Due to the fact that no broadcast decode is performed by the controller 14, the broadcast cycle is not detected or specifically acted upon external to the processor 12. Therefore, the bus cycle in which the broadcast was sent times out due to a watchdog TEA generated internal to the controller 14, and the processor enters the low-power mode. Preferably, in low-power mode, the processor 12 drives the bus 18 to all logic ones (i.e., a logic one is typically a voltage within the range of 2.0 volts to 5 volts, approximately). In other systems, the processor may be programmed or designed to drive logic zeros or tri-state values onto the bus in low-power mode, although logic ones are preferred. Specifically, when in low-power mode, the processor 12 specifically drives address bits, data bits, attribute bits, and most control signals to the predetermined values discussed above (preferably logic ones).

Also, if the processor 12 receives no response to the low-power broadcast cycle within the programmable watchdog time frame, the processor 12 may be operating in a single processor system wherein entering the low-power mode of operation will affect no other processors (i.e., no master 16 is present). In this case, the time out of the watchdog informs the processor 12 (i.e., gives permission) that the low-power mode can be entered by processor 12 because it is the only master controller in the system.

In another example, assume the processor 12 is operating in a single processor system (i.e., no master 16 is present). In addition, the system 10 has additional hardware which supports a low-power mode of operation. For example, assume that the processor 12 has access to memory, timers, or other peripherals that can enter a low-power mode of operation along with the processor 12 to further reduce system power consumption. In order to enter low-power mode, the processor issues a broadcast cycle on the bus 18. External hardware analogous to the bus controller 14 or the controller 14 itself detects the broadcast signal and sends out control signals to all low-power peripherals in the system informing the low-power peripherals that the processor 12 is going into low-power mode. The bus controller 14 sends a TA signal to terminate the bus cycle and the bus 18 remains granted to the processor via assertion of a Bus Grant signal (the processor 12 is the only processor which can control the bus 18). It is important to note that a peripheral device may be granted the bus 18 in low-power mode if the peripheral device has intelligence enough to drive the bus 18 to a logic one value in low-power mode. The processor 12 and the peripherals enter the low-power mode and the processor 12 drives the bus 18 to logic ones.

It is important to note that either the memory bus controller 14 or the processor 12 can shut down one or more clock signals in low-power mode by sending control signals (e.g., a processor status control signal) to a system clock control circuit 13. The clock signal in FIG. 1 may be one clock signal or several clock signals. Disabled system clocks can greatly improve power consumption in a low-power mode. In general, a two-phase hand-shaking low-power shut-down can occur as follows: the processor 12 informs controller 14 that low-power shut-down is to occur; the controller 14 gives the processor 12 permission to enter the low-power mode; the processor 12 informs the controller 14 when low-power mode is entered after permission is granted; and controller 14 coordinates peripherals, clocks, etc., to also enter the low-power mode after the processor 12 enters low power mode. Concurrent shut-down of processor 12 along with clocks and peripherals may also be performed by the controller 14.

In another example, the system illustrated in FIG. 1 is utilized. The processor 12 of FIG. 1 intends to enter a low-power mode and sends a broadcast cycle through bus 18. The alternate bus master 16 cannot enter low-power mode either because it does not support a low-power mode or is unable to enter a low-power mode at this time. The controller 14 detects and terminates the bus broadcast cycle with a TA signal. The bus 18 is granted, via a Bus Grant signal, to the alternate master 16 due to the fact that the master 16 will not be entering into the low-power mode. The assigning of the bus 18 to the master 16 may require that the access of the bus 18 be taken away from the processor 12 and given to the master 16. The processor 12 enters a low-power mode. Due to the fact that processor 12 is not currently in possession of bus 18, processor 12 tri-states the connections between the processor 12 and the bus 18 so that master 16 can use the bus 18 while not being hindered by processor 12 and the low-power mode of operation of processor 12. External hardware can determine that the low-power state was entered and shut down clocks, peripherals and the like depending upon system design constraints.

In yet another example, the system in FIG. 1 is utilized as illustrated. The processor 12 of FIG. 1 intends to enter a low-power mode and sends a broadcast cycle. The alternate bus master 6 is also available to enter the low-power mode or is also trying to enter a low-power mode of operation. The alternate bus master 16 can be shut down in a manner similar to processor 12. If alternate bus master 16 is a different processor which requires extra processing or no processing to enter the low-power mode, the controller 14 or external hardware can control the low-power mode of master 16 accordingly. The controller 14 receives the broadcast cycle and terminates the bus broadcast cycle with a TA signal usually generated by the controller 14. In some designs, the processor 12 or a slave device can generate the TA signal instead of the controller 14. The bus 18 is not granted to any processor in the system due to the fact that external pull-up resistors or known keeper logic circuit(s) are coupled to the bus 18. Both the master 16 and the processor 12 tri-state their respective bus connections. The tri-stating of the bus 18 may require that the access of the bus 18 be taken away from either the processor 12 or the master 16 before the TA signal is transmitted. Both the processor 12 and the master 16 enter a low-power mode. External hardware can determine that the low-power state was entered and shut down clocks, peripherals and the like depending upon system design constraints.

In yet another example, the system in FIG. 1 is utilized wherein the alternate bus master 16 has a low-power mode capability but has a pending bus operation. The processor 12 intends to enter a low-power mode and sends a broadcast cycle through the bus 18. External hardware terminates the bus cycle with a Transfer Retry Acknowledge (TRA) signal. If the processor 12 has the bus 18 via an asserted Bus Grant signal, the bus 18 is taken from processor 12 before the processor 12 can retry the bus cycle and the bus 18 is given to the master 16 to proceed with the pending bus operation. Once the pending bus operation is completed, the bus is given back to the processor 12 (i.e., the Bus Grant to processor 12 is reasserted). Processor 12 is now free to rerun the broadcast cycle. The alternate bus master 16 is now also available to enter the low-power mode. The controller 14 receives the broadcast cycle and terminates the bus broadcast cycle with a TA signal. The bus 18 is arbitrarily granted to the processor 12 or granted to the last controller that had access to the bus 18. The master 16 tri-states its respective connections to bus 18 and the processor 12 drives logic ones on the bus to prevent noise on the bus. The processor 12 and the master 16 enter the low-power mode. External hardware (not specifically illustrated in FIG. 1) can determine that the low-power state was entered and shut down clocks, peripherals and the like depending upon system design constraints.

It should be noted that the bus controller 14 may have intelligence enough to determine that it is not advantageous to the system that the processor 12 enter a low-power mode of operation. For example, the controller 14 may have knowledge that the processor 12 is required to be in full operation in the near future to handle a peripheral or the like. The controller 14 then can, via delay of the assertion of TA or TEA and bus arbitration or TRA signals, delay the processor 12 from entering into a low-power mode of operation until a more opportune time. In another form, the TRA signal can be asserted and the Bus Grant (BR) is removed to delay entrance into the low-power mode. Also, the processor 12 may be prevented from entering a low-power mode of operation by asserting an interrupt or asserting a reset signal.

In general, in system 10, the bus master or processor which has been given grant privileges of the bus 18 when going into low-power mode will drive the bus 18 to logic ones, whereas all other processors in system 10 will tri-state the bus 18 for reduced bus contention and reduced power consumption. In some cases, a bus may be fully tri-stated by all devices in a system. In this case, pull-up devices may be used to drive ones onto the bus 18 or the bus may be allowed to float (in some designs, the noise from floating inputs/outputs is not critical).

As can be seen from the above examples, the system of FIG. 1 provides improved functionality and flexibility over conventional methods of controlling a system integrated low-power mode.

Figure 2:
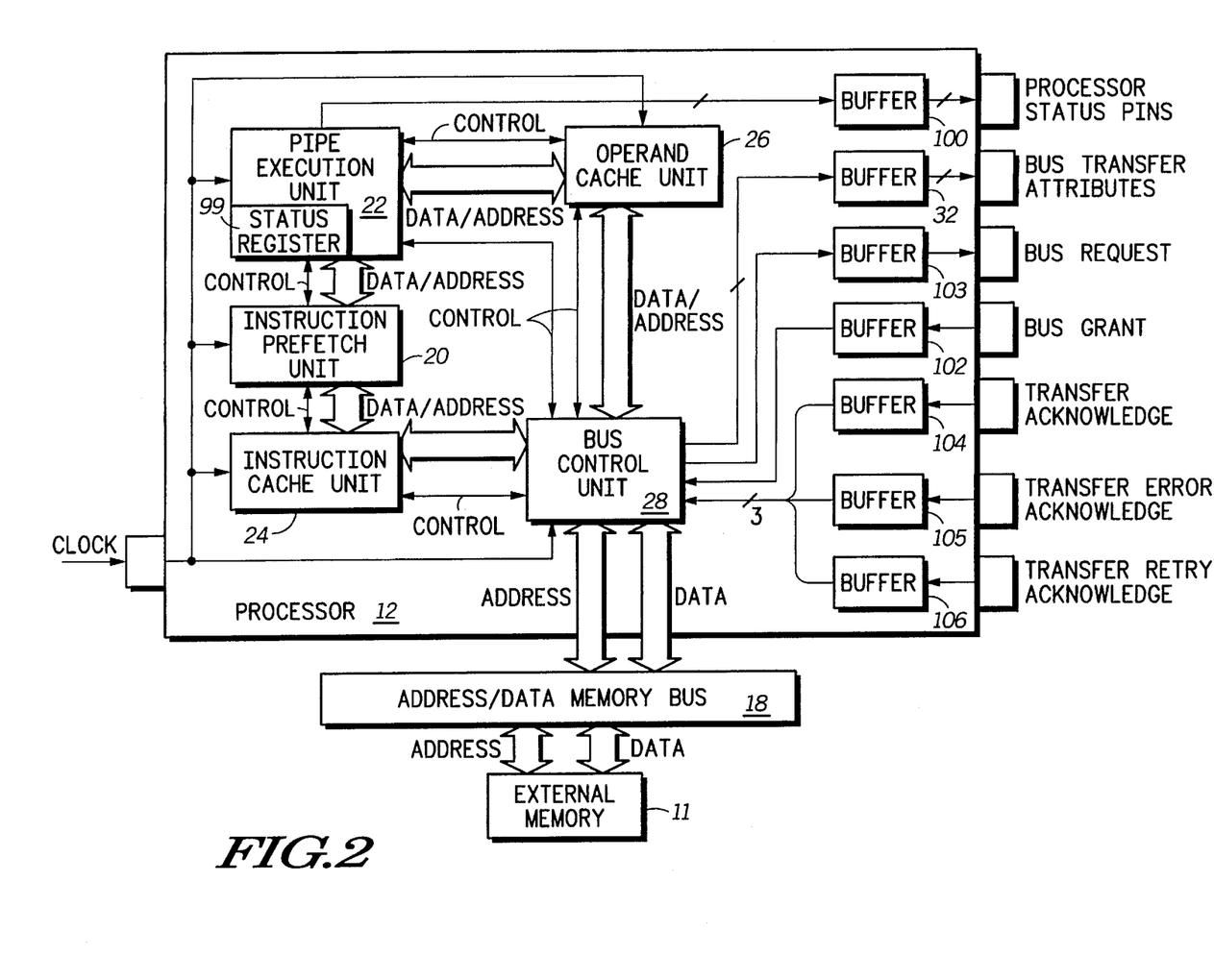
FIG. 2 illustrates, in a block diagram form, the processor of FIG. 1.

FIG. 2 illustrates the processor 12 in more detail. FIG. 2 is intended to more accurately depict what is required within processor 12 in order for the processor 12 to function within the system 10 of FIG. 1. Processor 12 has an instruction prefetch unit 20. Unit 20 is a state machine or a sequencer circuit that supplies the processor 12 with a constant stream of instructions to execute. The instructions are usually stored in any memory device within the system 10 or processor 12. Unit 20 sends address bits out to an external memory 11 via the bus control unit 28 and the address/data memory bus 18. Memory 11 may, in another form, be internal to either the processor 12 or any alternate bus master. Memory 11 is illustrated in FIG. 2 as being a memory system which is accessed via the bus control unit 28 and memory bus 18. Also, memory 11 could be an external local memory or local cache memory which is directly accessible by only the processor 12. Many types of memory may be used to form external memory 11. For example, the memory 11 may include dynamic random access memory (DRAM), random access memory (RAM), fast static random access memory (FSRAM), read only memory (ROM), erasable programmable read only memory (EPROM), electrically erasable programmable read only memory (EEPROM), peripheral memory (i.e., disk drive, tape drive, drum memory, and/or floppy disk memory), combinations of the memory elements, and like memory elements.

The external memory 11, upon receiving address bits from the unit 20 and the bus control unit 28, communicates instructions, data, operands, opcodes, and/or like data to the processor 12. An instruction cache unit 24 stores instructions to be executed by the processor 12. Instruction cache unit 24 is a memory portion of processor 12 and is coupled to the pipe execution unit 22. The instructions stored in instruction cache unit 24 are communicated to a pipe execution unit 22 for execution by the processor 12. In general, pipe execution unit 22 may be referred to as the core or central processing unit (CPU) of the processor 12. Unit 22 communicates to unit 20 via one or more control lines labeled "control" in FIG. 2 and a plurality of data lines.

Unit 22 is connected to an operand cache unit 26 via a bus and one or more control lines. Operand cache unit 26 is a cache system similar to instruction cache unit 24. Operand cache unit 26 is coupled to a bus control unit 28 which allows processor 12 to communicate externally to the memory bus controller 14 of FIG. 1. Input buffers, output buffers, or input/output (I/O) buffers, such as buffers 32, 100, 102, 103, 104, 105, and 106 are used to communicate signals such as bus transfer attribute bits, the processor status bits, the bus request signal, the bus grant signal, the transfer acknowledge, the transfer error acknowledge, the transfer retry acknowledge into and/or out from the processor 12.

Once the processor determines that a low-power mode should be entered, by the execution of an LPSTOP instruction or the like, the broadcast cycle is generated by the execution unit 22 and is sent out of the processor 12 and eventually through the bus 18. The broadcast cycle involves setting a group of bus transfer attribute pins, referred to as Transfer Type (TT) pins, to an "Acknowledge Access" state (i.e., a binary 11). Transfer Modifier (TM) bits, which are a portion of the bus transfer attribute pins, are set to zero. Bits, referred to as SIZE bits within the bus transfer attribute pins, are set to indicate that a word (or two bytes) is transmitted in the broadcast cycle. The SIZE bits are set to a binary 10 to indicate a two byte transfer. It should be understood that any number of bytes/bits may be transmitted for a broadcast cycle to indicate a low-power mode request. A Read/Write (R/W*) control signal, which is at least one bit in the bus transfer attribute pins, is set to indicate a write operation. The address bus is set to hexadecimal address 0xFFFFFFFE, and the data bus transmits an operand of the LPSTOP instruction which indicates a bus mask data value. The syntax for an LPSTOP instruction is:

*LPSTOP#<bus mask data value>*

The bus mask data value; also referred to as an interrupt mask or bus data value, is loaded into a program status register 99 in processor 12. The bus mask data value is an operand data value which is used to indicate to the controller 14 and all other connected peripherals under what circumstances the processor 12 is to be brought out of low-power mode. The processor (12) is to be brought out of low-power mode only if a reset occurs or an interrupt occurs wherein the interrupt has a higher priority than a priority set by the bus mask data value. If an interrupt does not have a priority greater than the bus mask data value indicates, then the interrupt is ignored and the processor 12 remains in low-power mode.

The controller 14 identifies the broadcast cycle, for example by decoding the transfer attribute bits TT=11 (transfer cycle type=binary 11) and TM=000 (transfer cycle modifier=binary 000). Other peripherals, such as an interrupt controller (not illustrated) may decode the address bits which are typically set to 0xFFFFFFFE, although other address values may be used.

The processor 12 then enters a state wherein the processor 12 is waiting for either a TA, TEA, TRA, or a like transmission termination signal to be received on external pins illustrated in FIG. 2. The time interval from the point at which the broadcast is sent and the transmission termination is received is variable depending upon the amount of time needed for the bus controller 14 to perform bus arbitration, inform peripherals, and perform other system functions prior to the entrance of the low-power mode of operation. Once a transmission termination signal is received by processor 12 from controller 14, the processor 12 enters a low-power mode of operation and indicates that the low-power mode has been entered by driving a unique encoding on the processor status pins 100. The clock or a plurality of clocks may be shut down via system clock control 13. The processor 12 drives either a tri-state value or a set of logic ones onto the bus in low-power mode in response to the Bus Grant signal (i.e., depending upon the state of the Bus Grant signal when the broadcast cycle is terminated). Ones are preferably driven due to the fact that external pull-up resistors/transistors are usually connected to the bus. Driving logic ones minimizes the current flow through the bus, thereby further reducing power. For systems that have no pull-up resistors but must maintain a valid logic level on the bus 18, logic ones are also driven on bus 18.

Figure 3:
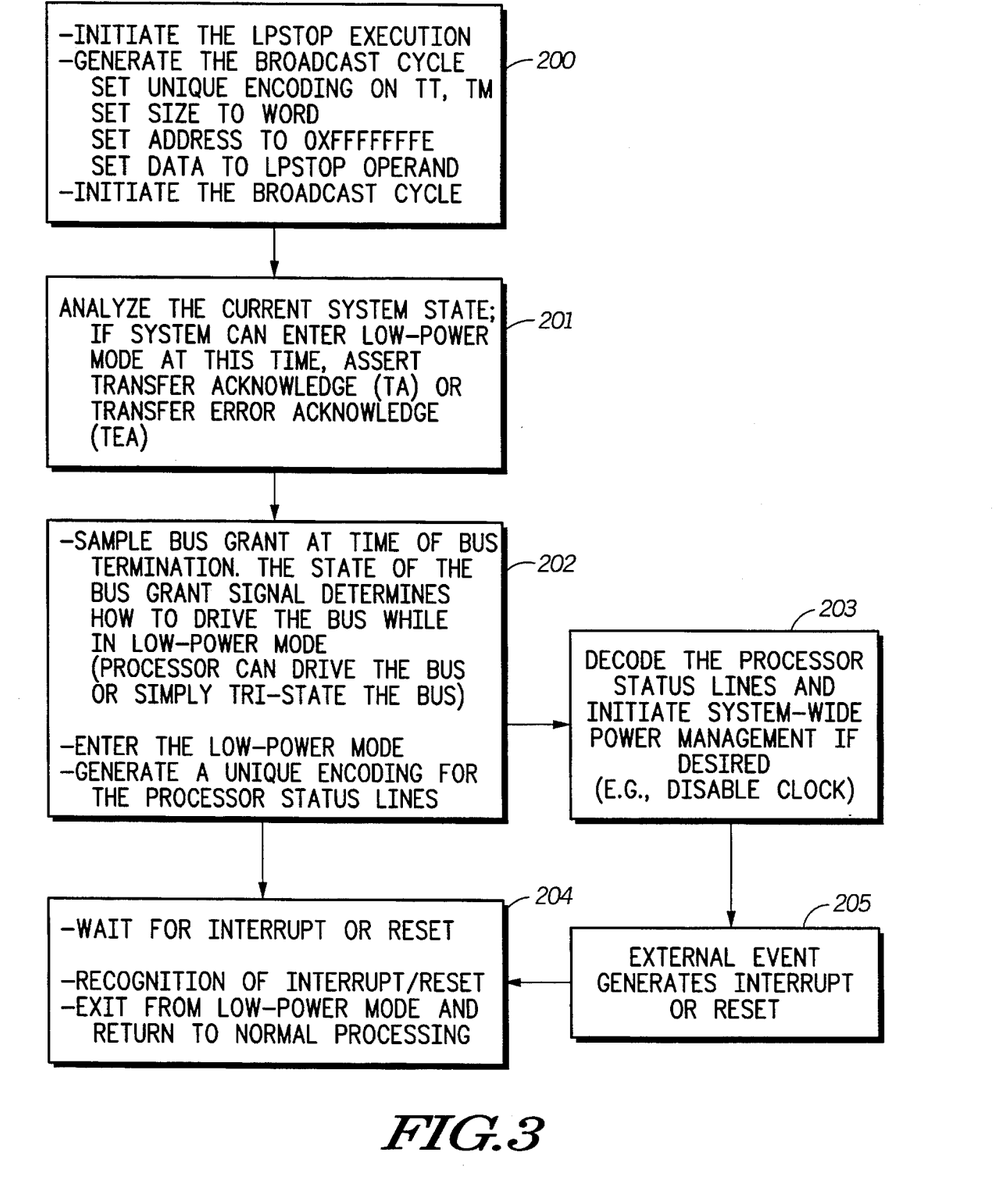
FIG. 3 illustrates, in a flowchart, how an low-power mode is entered by the processor of FIG. 1.

FIG. 3 illustrates a typical response of the system 10 to a low-power mode request (i.e., the execution of an LPSTOP instruction). FIG. 3 is included as a summary of the steps required to enter a system-wide low-power mode of operation. A step 200 indicates what the processor 12 does in order to request entry into a low-power mode of operation. The appropriate setting of the TT, TM, SIZE, and address bits are discussed above. The LPSTOP operand is the bus mask data value referred to above as the operand for the LPSTOP instruction. A step 201 is performed by the memory bus controller 14. The step 201 is discussed specifically above. Briefly, step 201 determines if the system is ready to enter a low-power mode, and if so, asserts a TEA* or TA* ('*' denotes an active low signal and is a design choice). A step 202 indicates various actions which are performed just prior to and/or just after the processor 12 is allowed to enter the low power mode. The functions in step 202 are performed by the processor 12. A step 203 is optional and indicates that the system clock(s) may be disabled (i.e., shutdown) by system clock control 13 of FIG. 1 after the processor 12 enters the low-power mode. A step 204 indicates that the processor 12, when in low-power mode, waits for a reset or an interrupt to occur. Step 204 indicates that once an interrupt or a reset is received, the low-power mode is exited and normal processing resumes. A Step 205 indicates that, in many cases, an external source or peripheral generates an interrupt or a reset to waken the processor from the low-power mode.

Figure 4:
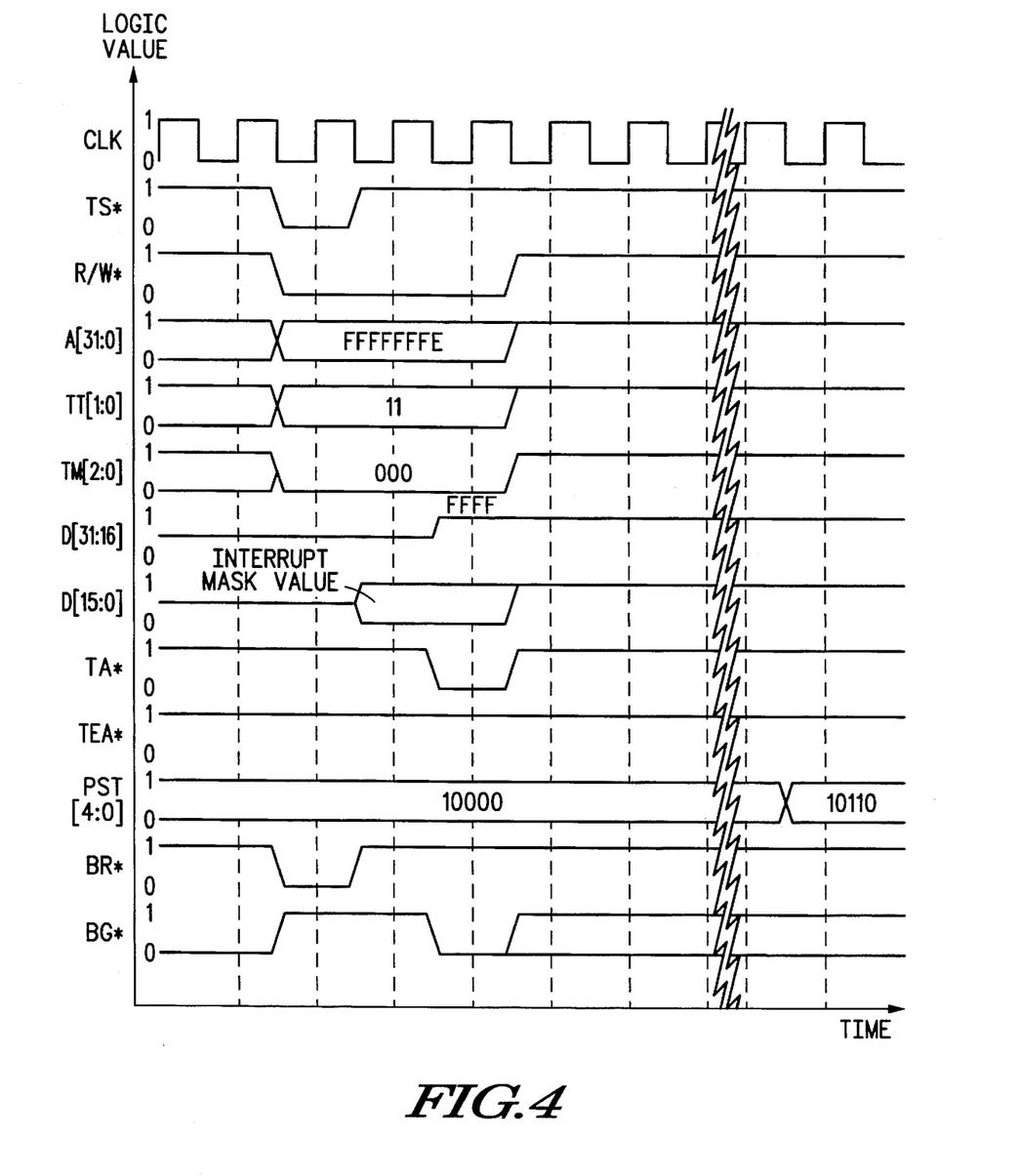
FIGS. 4 and 5 illustrate, in a timing diagram, how a plurality of bits associated with the processor of FIG. 1 function together to initiate an low-power mode of operation in accordance with the present invention.
Figure 5:
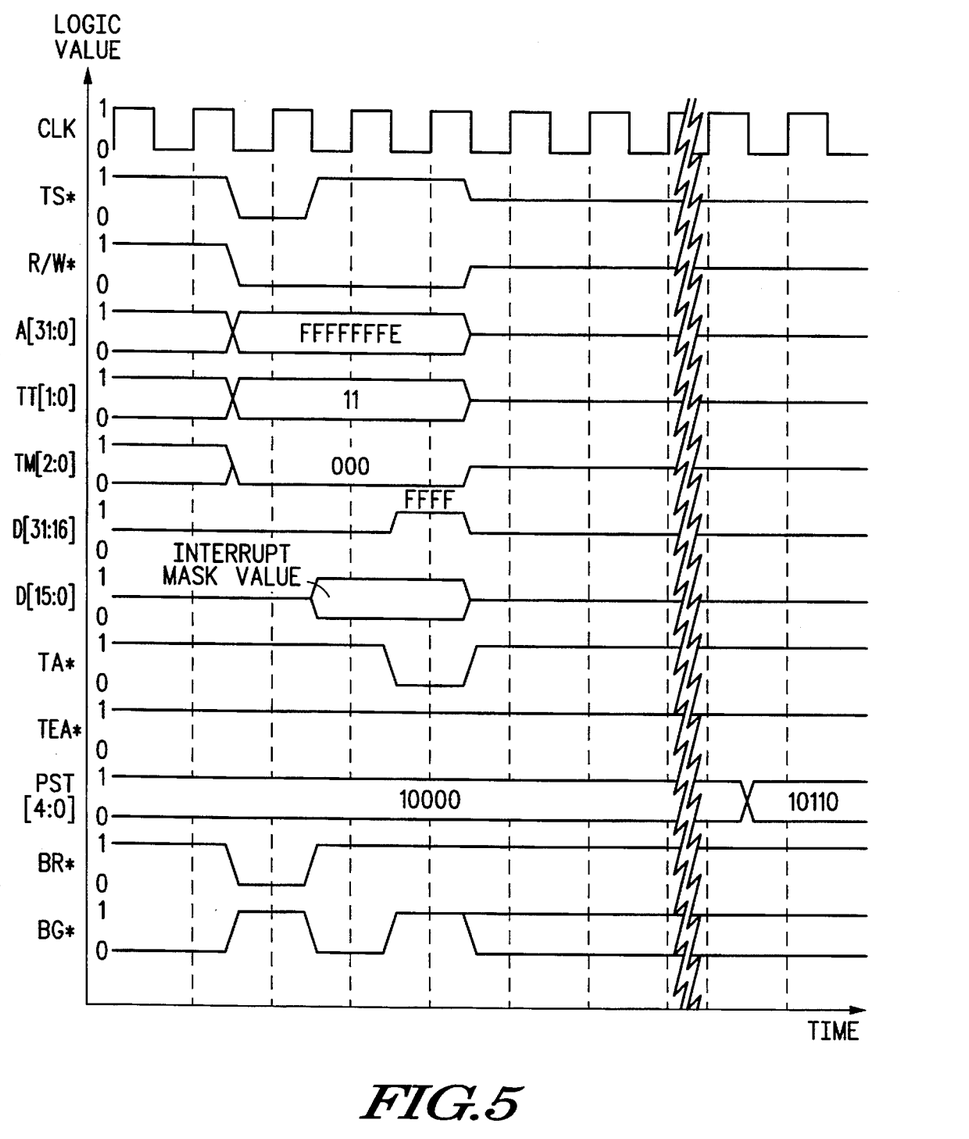

FIGS. 4 and 5 each illustrate a timing diagram of an LPSTOP bus cycle. The only difference between FIGS. 4 and 5 is the state of the BG* bit (Bus Grant bit) at the time of the termination of the LPSTOP bus cycle. It is important to note that the '*' symbol on signal names means that the signals are active low. The signals in FIGS. 4 and 5 are as follows: CLK=clock; TS*=transfer start; R/W*=read/write bit; A[31:0]=address bits; TT[1:0]=transfer cycle type bits; TM[2:0]=transfer cycle modifier bits; D[31:16 and D[15:0] =data bits; TA*=transfer acknowledge; TEA*=transfer error acknowledge; PST[4:0]=processor status bits; BR*=bus request; and BG*=bus grant.

FIG. 4 illustrates that all the tristateable output signals of the processor 12 (such as address bits and data bits) will be continuously driven high during low-power mode if the LPSTOP bus cycle is terminated with the BG* of processor 12 asserted. FIG. 5 illustrates that all the tristateable output signals of the processor 12 will be tri-stated during low-power mode if the LPSTOP bus cycle is terminated with BG* negated. After the LPSTOP bus cycle is terminated, all bus signals have reached their quiescent state (driven high or tri-stated), and the PST[4:0] signal indicates via a binary 10110 that the processor 12 is in a low-power mode of operation. The processor clock CLK may be stopped in a low state as indicated in FIGS. 4–5 and discussed herein. When the processor 12 is in the low-power mode with the clock(s) stopped, a minimal amount of current will be drawn. In this state, all inputs to the processor 12 may also be tri-stated without harming the processor 12 or causing extra current drain. FIGS. 4–5 illustrate that the TA* or TEA* is used to terminate the bus cycle.

In order to bring the processor 12 out of the low-power mode, CLK must be restarted and either RSTI* (a reset signal) must be asserted or an external interrupt of higher priority than the bus mask data value (i.e., LPSTOP operand) of the LPSTOP instruction must occur. In a preferred form, the CLK should be restarted at least eight cycles prior to the recognition of the interrupt or reset. It should be apparent that in many cases, the number of clock cycles required by a processor 12 before the assertion of reset or an interrupt is largely a function of design. The number of clock cycles may be within the range of one clock cycle to several hundred or several thousand clock cycles.

In summary, the FIGS. 1 and 2 illustrate a data processor system which allows for a low-power mode wherein the outputs of the processor are preferably and conditionally driven to either logic ones or a tri-state value depending upon the bus acquisition. A single processor system with minimal hardware will send a broadcast cycle, wait for a transmission termination, and either time out via an watch-dog TEA signal or receive a TA or TEA signal from a controller to enter the low-power mode of operation. In a multi-master system, the system 10 does not require external control for an additional pin. The hardware used for the above low-power mode entrance method serves multiple purposes (i.e., the bus 18 and the bits TA, TEA, TRA, serve other purposes than providing a method for entering low-power mode). Therefore, hardware has been minimized in an efficient manner over prior systems.

The system provides maximal flexibility due to the fact that the processor waits for a transmission termination before entering low-power mode. Therefore, the system 10, or in particular a bus controller 14, can coordinate, arbitrate, and effectively control a system-wide low-power mode. The time from the broadcast cycle to the low-power shut-down is variable due to the termination signals. Bus arbitration can occur up until the broadcast cycle is acknowledged via a TA, TEA, or a like transmission control signal. The logic state of the bus grant signal, at the time of bus cycle termination, determines which values are driven onto the bus from processor 12 or other masters in the system similar to processor 12.

While the present invention has been illustrated and described with reference to specific embodiments, further modifications and improvements will occur to those skilled in the art. For example, a watch-dog time-out may be designed so that the processor must perform other operations before entering low-power mode. There are many ways in which to communicate a transmission termination in order to enter the low-power mode taught herein. The number (i.e., size) of buses and control signal bits may vary. The nature of the broadcast cycle (i.e., what information is sent and in what order) may vary depending upon system constraints. It is important to note that clocks, if disabled during low-power mode, must be restarted before the interrupt or reset can be used to bring the processor out of a low-power mode of operation. It is also important to note that all processors in the system usually have access to a bus, but only one processor at a time is granted access or granted ownership of the bus to avoid bus contention. Control signals taught herein may be either active high or active low. It is to be understood, therefore, that this invention is not limited to the particular forms illustrated and that it is intended in the appended claims to cover all modifications that do not depart from the spirit and scope of this invention.

We claim:

1. A method for controlling a bus within a data processing system, the data processing system having a data processor coupled by at least one control bit line to circuitry for providing bus management, the method comprising:

determining that the data processor is to be placed into a low-power mode;

performing a low-power mode broadcast through the bus wherein the data processor communicates to the circuitry for providing bus management that the data processor is to be placed into a low-power mode of operation;

placing the data processor into a state wherein the data processor waits for the circuitry for providing bus management to communicate permission to the data processor to enter low-power mode, the permission being sent within an amount of time determined by the circuitry for providing bus management; and determining via the circuitry for providing bus management whether the data processor is to drive the bus to a predetermined plurality of voltage values or electrically tri-state the bus when in the low-power mode of operation.

2. The method of claim 1 wherein the step of determining via the circuitry for providing bus management comprises the step of:

driving the predetermined plurality of voltage values as voltage values selected from a group consisting of: all binary one values and all binary zero values.

3. The method of claim 1 wherein the step of placing the data processor into a state wherein the data processor waits for the circuitry for providing bus management to communicate permission comprises the step of:

sending either a transfer acknowledge (TA) signal or a transfer error acknowledge (TEA) signal from the circuitry for providing bus management to the data processor to give the data processor permission to enter the low-power mode of operation.

4. The method of claim 1 wherein the step of placing the data processor into a state wherein the data processor waits for the circuitry for providing bus management to communicate permission comprises the step of:

placing the data processor into the low-power mode of operation after a predetermined watchdog time period if no response to the broadcast is received from the circuitry for providing bus management within the predetermined watchdog time period.

5. The method of claim 1 wherein the step of placing the data processor into a state wherein the data processor waits for the circuitry for providing bus management to communicate permission comprises the step of:

preempting the data processor from entering the low-power mode of operation if the circuitry for providing bus management determines that the data processor should not be placed into a low-power mode of operation.

6. The method of claim 1 wherein the step of placing the data processor into a state wherein the data processor waits for the circuitry for providing bus management to communicate permission comprises the step of:

changing access to the bus in response to the low-power mode of operation being requested by the data processor.

7. The method of claim 6 wherein the step of changing access to the bus comprises the step of:

changing access to the bus before the data processor is given permission to enter the low-power mode of operation.

8. The method of claim 1 wherein the circuitry for providing bus management communicates to the data processor a binary bus grant signal wherein the binary bus grant signal informs the data processor whether the bus is accessible to the data processor.

9. The method of claim 1 wherein the step of determining via the circuitry for providing bus management comprises the step of:

driving the bus to a tri-state condition if the data processor does not currently have ownership of the bus.

10. The method of claim 1 wherein the step of determining via the circuitry for providing bus management comprises the step of:

driving the bus to logic one values if the data processor currently has ownership of the bus.

11. A bus protocol for controlling a bus having at least one bit, the bus protocol controlling the bus in a manner which allows a data processor, which is coupled to the bus, to selectively enter a low-power mode of operation, the data processor having a bus grant status which determines the data processor ability to communicate with the bus, the method comprising:

broadcasting a request on the bus, the request being broadcast by the data processor to indicate external to the data processor that the data processor intends to enter into a low-power mode of operation;

placing the data processor into a mode wherein the data processor waits for a permission signal from the bus which allows the data processor to enter the low-power mode of operation;

allowing the data processor to enter the low-power mode of operation if either the permission signal is received from the bus or a predetermined amount of time passes and a watchdog permission signal is received from external to the data processor;

placing the data processor into a state wherein the at least one bit of the bus is driven to an electrical value, the electrical value being determined by the bus grant state of the data processor.

12. The method of claim 11 wherein the step of placing the data processor into a state comprises the step of:

driving the at least one bit of the bus to a value selected from a group consisting of: a binary one value, a binary zero value, a tri-state value.

13. The method of claim 11 wherein circuitry for controlling ownership to the bus is coupled to the data processor, the circuitry for controlling the bus communicating the permission signal to the data processor.

14. A system comprising:

an execution unit for executing computer instructions, the execution unit having a normal mode of operation and a low-power mode of operation, the low-power mode of operation is entered by broadcasting a low-power request external to the execution unit and waiting for the execution unit to receive permission to enter the low-power mode of operation from external to the execution unit;

a bus coupled to the means for executing computer instructions, the bus having at least one conductor for communicating information within the system, the at least one conductor being used to transmit the low-power request; and a bus controller coupled to the means for executing computer instructions through the bus, the bus controller granting the means for executing computer instructions selective access to the bus, the bus controller receiving the low-power request from the bus and sending the permission to enter the low-power mode of operation to the means for executing computer instructions, a time between the receipt of the low-power request and the sending of the permission being variable depending upon an amount of low-power mode preparation that is performed by the bus controller in order to prepare the system for the means for executing entering the low-power mode of operation.

15. The system of claim 14 wherein the means for executing computer instructions drives a set of values onto the bus when in the low-power mode of operation, the set of values being selected from a group consisting of: binary zeros, binary ones, and tri-state signals.

16. The system of claim 14 further comprising:

an alternate means for executing computer instructions coupled to the bus controller and the bus, the alternate means for executing computer instructions having access to the bus during times when the means for executing computer instructions does not have bus access.

17. The system of claim 14 further comprising:

one or more peripheral devices coupled to the bus, the peripheral devices being selectively accessed by the means for executing computer instructions through the bus.

18. The system of claim 14 wherein the access to the bus is changed by the bus controller after the means for executing computer instructions sends the low-power request and before the permission is transmitted.

19. The system of claim 14 wherein the means for executing computer instructions enters the low-power mode of operation after waiting a predetermined amount of time wherein at the end of the predetermined amount of time a transfer termination signal generated in response to a watchdog circuit is received.

20. The system of claim 14 further comprising:

a bus grant conductor coupling the means for executing and the bus controller, the bus grant conductor allowing the bus controller to signal the means for executing whether the means for execution has exclusive access to the bus; and a bus request conductor coupling the means for executing and the bus controller, the bus request conductor allowing the means for executing to request exclusive access of the bus from the bus controller.

21. A method for allowing a processor to enter a low-power mode of operation comprising:
  sending data external to the processor using a bus coupled to the processor, the data being used to indicate that the low-power mode of operation is requested;
  placing the processor into a mode wherein the processor waits for receipt of an externally-generated bus cycle termination control signal which signifies that the data has been processed, the time between the sending of the data and the receipt of the externally-generated bus cycle termination control signal being variable; and
  entering the low-power mode of operation in response to the externally-generated bus cycle termination control signal.

22. The method of claim 21 wherein the step of entering comprises:
  shutting down a clock signal which is coupled as an input to the processor.

23. A method for placing a system into a low-power mode of operation, the system having a processor and a bus controller, the method comprising:
  informing the bus controller that the processor desires to enter a low-power mode of operation;
  generating a permission control signal in the bus controller and transmitting the permission control signal to the processor, the permission control signal indicating that the processor may enter the low-power mode of operation;
  placing the processor into a low power mode of operation;
  informing the bus controller that the processor has entered the low power mode of operation; and
  placing at least one peripheral into a low-power mode of operation in response to the processor being placed into the low-power mode of operation.

24. The method of claim 23 wherein the step of placing at least one peripheral into a low-power mode of operation comprises:
  turning off at least one clock signal which is input into the processor.

* * * * *